United States Patent
Lee et al.

(10) Patent No.: US 10,622,842 B2
(45) Date of Patent: Apr. 14, 2020

(54) WIRELESS POWER RECEIVER AND CONTROL METHOD THEREOF

(71) Applicant: LG INNOTEK CO., LTD., Seoul (KR)

(72) Inventors: Ki Min Lee, Seoul (KR); Jung Oh Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/182,258

(22) Filed: Nov. 6, 2018

(65) Prior Publication Data
US 2019/0074727 A1 Mar. 7, 2019

Related U.S. Application Data

(63) Continuation of application No. 15/673,763, filed on Aug. 10, 2017, now Pat. No. 10,153,666, which is a (Continued)

(30) Foreign Application Priority Data

Nov. 4, 2011 (KR) .................. 10-2011-0114721

(51) Int. Cl.
*H02J 50/12* (2016.01)
*G06K 19/07* (2006.01)
(Continued)

(52) U.S. Cl.
CPC .......... *H02J 50/12* (2016.02); *G06K 19/0708* (2013.01); *G06K 19/0715* (2013.01);
(Continued)

(58) Field of Classification Search
CPC ............. H02J 50/10; H02J 50/12; H02J 50/70
See application file for complete search history.

(56) References Cited

U.S. PATENT DOCUMENTS

| 5,430,618 A | 7/1995 | Huang |
| 7,719,399 B2 | 5/2010 | Iwasaki |

(Continued)

FOREIGN PATENT DOCUMENTS

| CN | 1768462 A | 5/2006 |
| CN | 101286411 A | 10/2008 |

(Continued)

OTHER PUBLICATIONS

Office Action dated May 15, 2017 in Korean Application No. 10-2014-0081260.
(Continued)

*Primary Examiner* — Daniel Kessie
(74) *Attorney, Agent, or Firm* — Saliwanchik, Lloyd & Eisenschenk

(57) ABSTRACT

A wireless power receiver according to an embodiment wirelessly receives power from a wireless power transmitter. The wireless power receiver includes a printed circuit board having a reception space in a predetermined area, a receiving coil disposed in the reception space of the printed circuit board for receiving power from the wireless power transmitter, and a short-range communication antenna disposed on the printed circuit board while surrounding the receiving coil.

20 Claims, 11 Drawing Sheets

Related U.S. Application Data continuation of application No. 15/195,390, filed on Jun. 28, 2016, now Pat. No. 10,069,346, which is a continuation of application No. 13/658,116, filed on Oct. 23, 2012, now Pat. No. 9,461,364.

(51) Int. Cl.

| | | |
|---|---|---|
| *G06K 19/077* | (2006.01) | |
| *H01Q 1/22* | (2006.01) | |
| *H04B 5/00* | (2006.01) | |
| *H01Q 1/52* | (2006.01) | |
| *H02J 50/70* | (2016.01) | |
| *H01Q 7/00* | (2006.01) | |
| *H02J 50/80* | (2016.01) | |
| *H02J 7/02* | (2016.01) | |
| *H02J 7/04* | (2006.01) | |
| *H02J 50/10* | (2016.01) | |

(52) U.S. Cl.
CPC ..... *G06K 19/07783* (2013.01); *H01Q 1/2225* (2013.01); *H01Q 1/526* (2013.01); *H01Q 7/00* (2013.01); *H02J 7/025* (2013.01); *H02J 7/045* (2013.01); *H02J 50/70* (2016.02); *H02J 50/80* (2016.02); *H04B 5/0031* (2013.01); *H04B 5/0037* (2013.01); *H04B 5/0087* (2013.01); *H02J 50/10* (2016.02)

(56) References Cited

U.S. PATENT DOCUMENTS

| 7,948,208 | B2 | 5/2011 | Partovi et al. |
| 7,973,635 | B2 | 7/2011 | Baarman et al. |
| 8,456,856 | B2 | 6/2013 | Lin et al. |
| 8,922,160 | B2 | 12/2014 | Inoue |
| 9,240,824 | B2 | 1/2016 | Hillan et al. |
| 9,461,364 | B2 | 10/2016 | Lee et al. |
| 2004/0085247 | A1 | 5/2004 | Mickle et al. |
| 2004/0130915 | A1 | 7/2004 | Baarman |
| 2007/0069961 | A1 | 3/2007 | Akiho et al. |
| 2007/0182367 | A1 | 8/2007 | Partovi |
| 2008/0197960 | A1 | 8/2008 | Hasegawa et al. |
| 2008/0198560 | A1 | 8/2008 | Fujiwara et al. |
| 2008/0211455 | A1 | 9/2008 | Park et al. |
| 2009/0010316 | A1 | 1/2009 | Rofougaran |
| 2009/0096413 | A1 | 4/2009 | Partovi et al. |
| 2009/0237194 | A1 | 9/2009 | Waffenschmidt et al. |
| 2009/0284082 | A1 | 11/2009 | Mohammadian |
| 2009/0309550 | A1 | 12/2009 | Liu |
| 2010/0066304 | A1 | 3/2010 | Oshimi |
| 2010/0146308 | A1 | 6/2010 | Gioscia et al. |
| 2010/0191306 | A1 | 7/2010 | Stevenson et al. |
| 2011/0018358 | A1 | 1/2011 | Kozakai |
| 2011/0025265 | A1 | 2/2011 | Mochida et al. |
| 2011/0115303 | A1 | 5/2011 | Baarman et al. |
| 2011/0127953 | A1 | 6/2011 | Walley et al. |
| 2011/0217927 | A1 | 9/2011 | Ben-Shalom et al. |
| 2011/0227420 | A1 | 9/2011 | Urano |
| 2011/0316475 | A1 | 12/2011 | Jung et al. |
| 2012/0205989 | A1 | 8/2012 | Baarman |
| 2012/0282857 | A1 | 11/2012 | Zhang |
| 2013/0038278 | A1 | 2/2013 | Park et al. |
| 2013/0113422 | A1 | 5/2013 | Lee et al. |
| 2013/0175876 | A1* | 7/2013 | Kiyota ............... H01F 38/14 307/104 |
| 2015/0077053 | A1* | 3/2015 | Stamenic ............. H02J 7/0042 320/109 |

FOREIGN PATENT DOCUMENTS

| CN | 2012-15827 Y | 4/2009 |
| CN | 101517666 A | 8/2009 |
| CN | 20-1663492 U | 12/2010 |
| CN | 10-1964678 A | 2/2011 |
| CN | 10-1971453 A | 2/2011 |
| CN | 20-1749754 U | 2/2011 |
| CN | 101983466 A | 3/2011 |
| CN | 10-2195366 A | 9/2011 |
| EP | 0790667 A1 | 8/1997 |
| EP | 2 330 683 A1 | 6/2011 |
| EP | 2367262 A2 | 9/2011 |
| JP | 06-224043 A | 8/1994 |
| JP | 2006-302567 A | 11/2006 |
| JP | 2006-319223 A | 11/2006 |
| JP | 2009-247124 A | 10/2009 |
| JP | 2010-073976 A | 4/2010 |
| JP | 2011-523336 A | 8/2011 |
| KR | 10-2005-0105200 A | 11/2005 |
| KR | 10-2008-0074640 A | 8/2008 |
| KR | 10-2008-0095643 A | 10/2008 |
| KR | 10-2010-0067748 A | 6/2010 |
| KR | 10-2010-0112400 A | 10/2010 |
| KR | 10-2011-0033836 A | 3/2011 |
| KR | 10-2011-0056334 A | 5/2011 |
| KR | 10-2011-0103395 A | 9/2011 |
| KR | 10-2011-0120122 A | 11/2011 |
| KR | 10-2013-0015244 A | 2/2013 |
| KR | 10-2013-0016588 A | 2/2013 |
| KR | 10-2013-0049608 A | 5/2013 |
| KR | 10-2013-0049781 A | 5/2013 |
| KR | 10-2013-0072181 A | 7/2013 |
| KR | 10-1298660 B1 | 8/2013 |
| TW | 2009-38017 A | 9/2009 |
| TW | 2009-52303 A | 12/2009 |
| TW | 201132014 A | 9/2011 |
| WO | WO-2007/015599 A1 | 2/2007 |
| WO | WO-2010/047850 A1 | 4/2010 |
| WO | WO-2010/114687 A1 | 10/2010 |

OTHER PUBLICATIONS

Office Action dated Nov. 28, 2017 in Korean Application No. 10-2014-0081260.
Office Action dated Jan. 5, 2018 in Chinese Application No. 201610451640.3.
Office Action dated Jan. 11, 2018 in U.S. Appl. No. 15/195,390.
Communication dated Feb. 6, 2018 in European Application No. 12189931.4.
Notice of Allowance dated Oct. 23, 2013 in Korean Application No. 10-2011-0114721, filed Nov. 4, 2011.
Office Action dated Dec. 26, 2012 in Korean Application No. 10-2011-0114721, filed Nov. 4, 2011.
Office Action dated Jan. 6, 2014 in Korean Application No. 10-2013-0100314.
Office Action dated Jul. 22, 2013 in Korean Application No. 10-2011-0114721, filed Nov. 4, 2011.
Office Action dated Jun. 26, 2014 in Chinese Application No. 201210432152.X.
Search Report dated Sep. 3, 2013 in Korean Application No. 10-2013-0100314, filed Aug. 23, 2013.
European Search Report dated Feb. 17, 2015 in European Application No. 14167637.9.
European Search Report dated Feb. 18, 2015 in European Application No. 12189931.4.
Office Action dated Apr. 19, 2017 in Taiwanese Application No. 105133529.
Office Action dated Aug. 6, 2014 in Taiwanese Application No. 101139085.
Office Action dated Jul. 17, 2014 in Korean Application No. 10-2013-0018321.
Office Action dated Jan. 18, 2019 in Taiwanese Application No. 106135104, along with its English translation.
European Search Report dated Jun. 25, 2019 in European Application No. 19159579.2.
Office Action dated Sep. 10, 2019 in Korea Patent Application No. 10-2019-0080545.

* cited by examiner (a)

(b)

WIRELESS POWER RECEIVER AND CONTROL METHOD THEREOF

CROSS REFERENCE TO RELATED APPLICATIONS

This application is a continuation of U.S. application Ser. No. 15/673,763, filed Aug. 10, 2017; which is a continuation of U.S. application Ser. No. 15/195,390, filed Jun. 28, 2016, now U.S. Pat. No. 10,069,346, issued on Sep. 4, 2018; which is a continuation of U.S. application Ser. No. 13/658,116, filed Oct. 23, 2012, now U.S. Pat. No. 9,461,364, issued on Oct. 4, 2016; which claims the benefit under 35 U.S.C. § 119 of Korean Patent Application No. 10-2011-0114721, filed Nov. 4, 2011, all of which are incorporated herein by reference in their entirety.

BACKGROUND

The embodiment relates to a wireless power receiver and a control method thereof.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Recently, among wireless power transmitting technologies, an energy transmitting scheme employing resonance has been widely used.

Since an electric signal generated between the wireless power transmitter and the wireless power receiver is wirelessly transferred through coils in a wireless power transmitting system using electromagnetic induction, a user may easily charge electronic appliances such as a portable device.

However, due to the thickness of each of a receiving coil, a short-range communication antenna and a printed circuit board constituting a receiving side, a size of an electronic appliance becomes larger and it is not easy to embed them in the electronic appliance. Specifically, the size of the electronic appliance is increased corresponding to the thickness of the receiving coil, the short-range communication antenna and the printed circuit board.

Further, when an overcurrent flows through the short-range communication module, it is difficult to effectively cope with the overcurrent.

Further, a magnetic field generated from the receiving coil exerts an influence on an inside of an electronic appliance, so that the electronic appliance malfunctions.

SUMMARY

The embodiment provides a wireless power receiver with a minimized thickness by suitably arranging a receiving coil, a short-range communication antenna and a printed circuit board.

The embodiment provides a wireless power receiver with a reduced thickness by allowing a short-range communication antenna to be included in a printed circuit board.

The embodiment provides a wireless power receiver which inhibits an electronic appliance from malfunctioning using a shielding unit.

The embodiment provides a wireless power receiver which breaks an overcurrent by using a protecting unit to protect a short-range communication module.

A wireless power receiver according to the embodiment wirelessly receives power from a wireless power transmitter. The wireless power receiver includes: a printed circuit board having a reception space in a predetermined area; a receiving coil disposed in the reception space of the printed circuit board for receiving power from the wireless power transmitter; and a short-range communication antenna disposed on the printed circuit board while surrounding the receiving coil.

A wireless power receiver according to the embodiment wirelessly receives power from a wireless power transmitter. The wireless power receiver includes: a short-range communication antenna for performing short-range communication; a receiving coil for wirelessly receiving power from the wireless power transmitter; and a switch for changing a conducting state of the short-range communication antenna according to a reception of the power, wherein the wireless power receiver opens or shorts the switch according to the reception of the power.

A method of controlling a wireless power receiver, which includes a short-range communication antenna for communicating with an outside, according to the embodiment includes determining whether power is received from a transmitting coil through electromagnetic induction; opening a switch which changes a conducting state of the short-range communication antenna when the power is received; identifying whether an amount of received power is equal to or greater than a threshold value; and shorting the switch when the amount of the received power is equal to or greater than the threshold value.

According to the embodiments, the thickness of the wireless power receiver can be minimized by suitably arranging the receiving coil, the short-range communication antenna and the printed circuit board.

According to the embodiments, the wireless power receiver can be inhibited from being broken by inhibiting an overcurrent from flowing in the wireless power receiver and malfunction of the wireless power receiver can be inhibited by shielding a magnetic field.

DETAILED DESCRIPTION OF THE EMBODIMENTS

Hereinafter, exemplary embodiments of the disclosure will be described in detail so that those skilled in the art can easily comprehend the disclosure.

Figure 1:
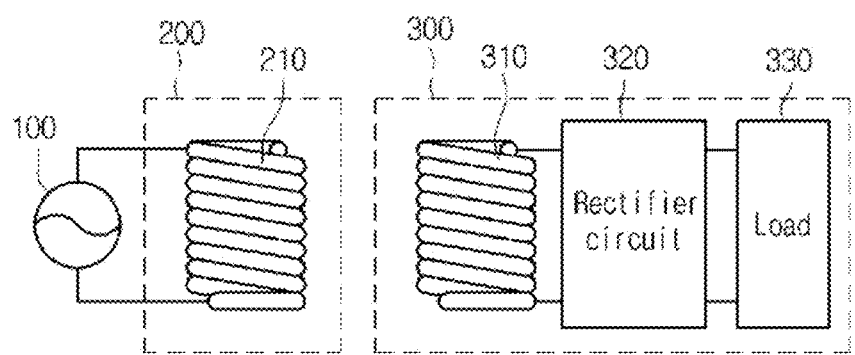
FIG. 1 is a view showing a wireless power transmission system according to the embodiment.

FIG. 1 illustrates a wireless power transmission system according to an embodiment.

The power generated from a power source 100 is provided to a wireless power transmitter 200, such that the power is transferred by electromagnetic induction to a wireless power receiver 300.

In detail, the power source 100 is an AC power source for supplying AC power of a predetermined frequency.

The wireless power transmitter 200 includes a transmitting coil 210. The transmitting coil 210 is connected to the power source 100, such that an AC current flows through the transmitting coil 210. When the AC current flows through the transmitting coil 210, an AC current is induced to the receiving coil 310 physically apart from the transmitting coil 210 due to electromagnetic induction, so that the AC power is transferred to the wireless power receiver 300.

Power may be transferred by electromagnetic induction between two LC circuits which are impedance-matched with each other. The power transmission through electromagnetic induction may enable high efficiency power transmission.

The wireless power receiver 300 may include a receiving coil 310, a rectifier circuit 320 and a load 330. In the embodiment, the load 330 may be not included in the wireless power receiver 300, but may be provided separately. The power transmitted through the transmitting coil 210 is received at the receiving coil 310 by electromagnetic induction. The power transferred to the receiving coil 310 is transferred through the rectifier circuit 320 to the load 330.

Figure 2:
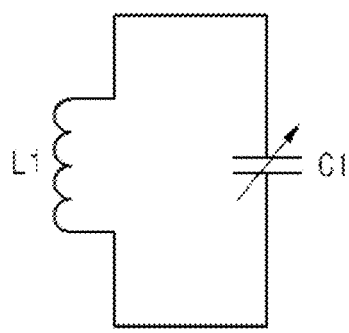
FIG. 2 is an equivalent circuit diagram of a transmitting coil according to the embodiment.

FIG. 2 is an equivalent circuit diagram of the transmitting coil 210 according to the embodiment.

As shown in FIG. 2, the transmitting coil 210 may include an inductor L1 and a capacitor C1, and form a circuit having a suitable inductance value and a suitable capacitance value. The capacitor C1 may be a variable capacitor. By controlling the variable capacitor, an impedance matching may be performed. Meanwhile, an equivalent circuit of the receiving coil 320 may be equal to that depicted in FIG. 2.

Figure 3:
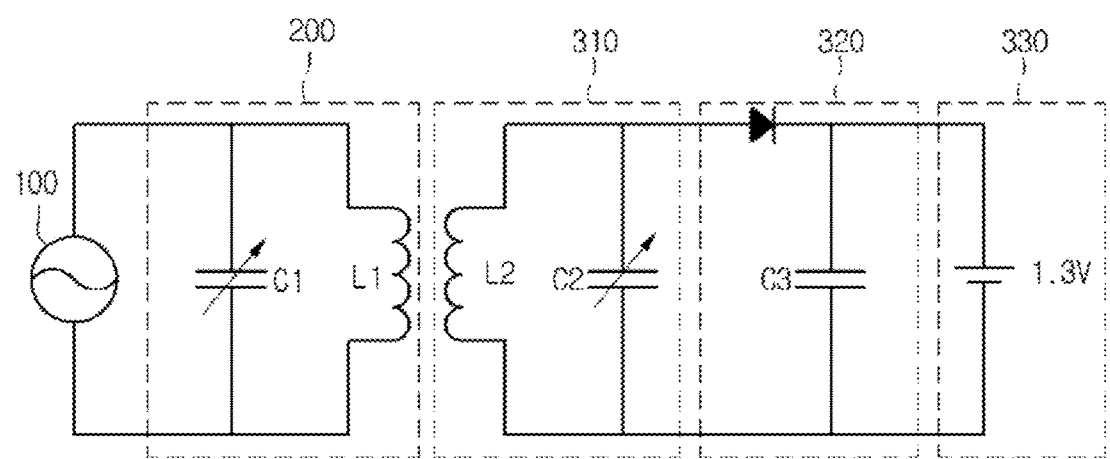
FIG. 3 is an equivalent circuit diagram of the wireless power transmission system according to the embodiment.

FIG. 3 is an equivalent circuit diagram of the wireless power transmitting system according to the embodiment.

As shown in FIG. 3, the transmitting coil 210 may include an inductor L1 having a predetermined inductance value and a capacitor C1 having a predetermined capacitance value.

Further, as shown in FIG. 3, the receiving coil 310 may include an inductor L2 having a predetermined inductance value and a capacitor C2 having a predetermined capacitance value. The rectifier circuit 320 may include a diode D1 and a rectifying capacitor C3 such that the rectifier circuit 320 converts AC power into DC power and outputs the DC power.

Although the load 330 is denoted as a DC power source, the load 330 may be a battery or other devices requiring DC power.

Next, a wireless power receiver according to the embodiment will be described with reference to FIGS. 4 to 10.

Figure 4:
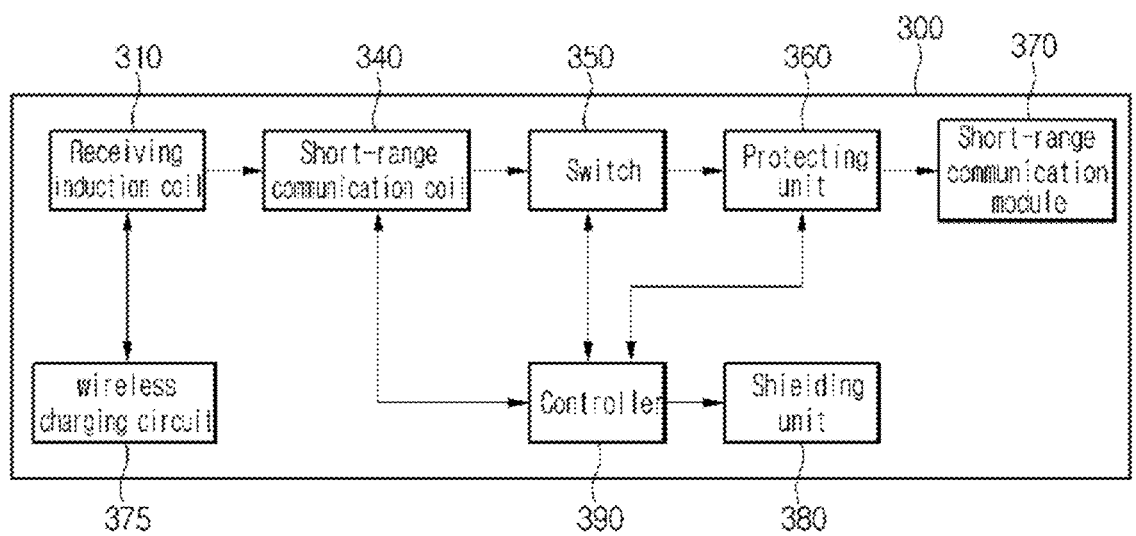
FIG. 4 is a block diagram of a wireless power receiver according to the embodiment.
Figure 5:
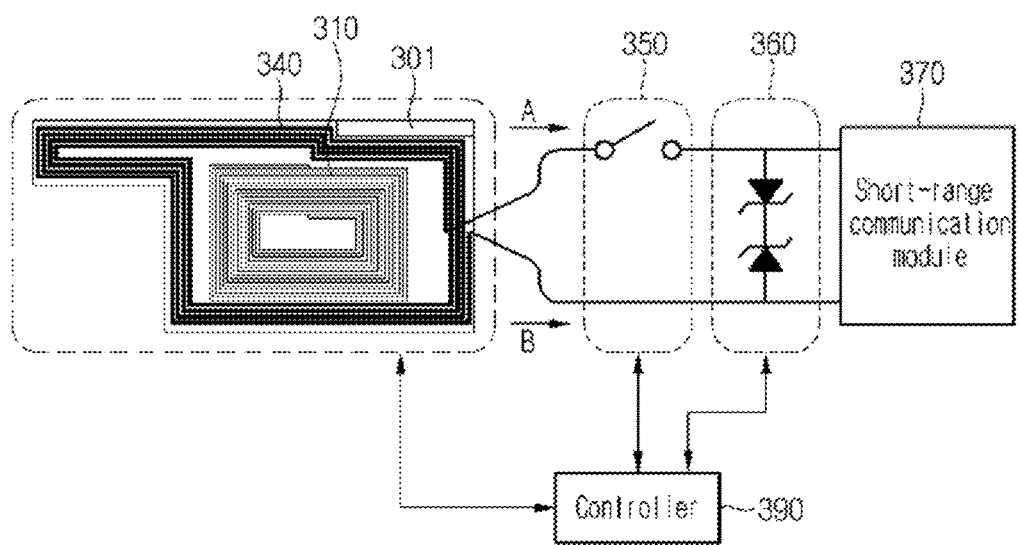
FIG. 5 is a view showing an example of a configuration of the wireless power receiver according to the embodiment.
Figure 6:
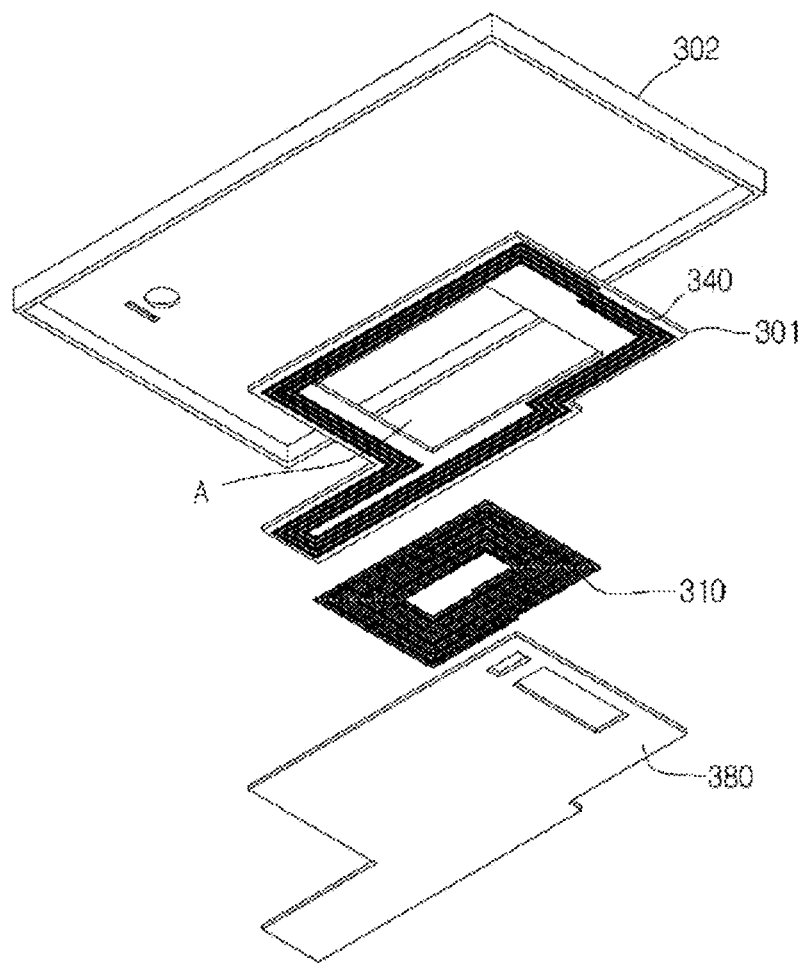
FIG. 6 is an exploded perspective and sectional view illustrating the wireless power receiver according to the embodiment.
Figure 6:
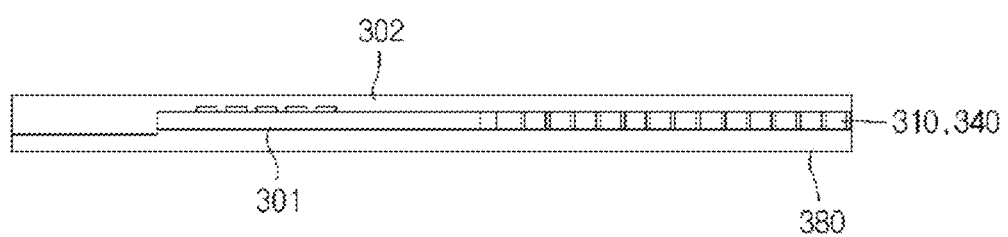
Figure 7:
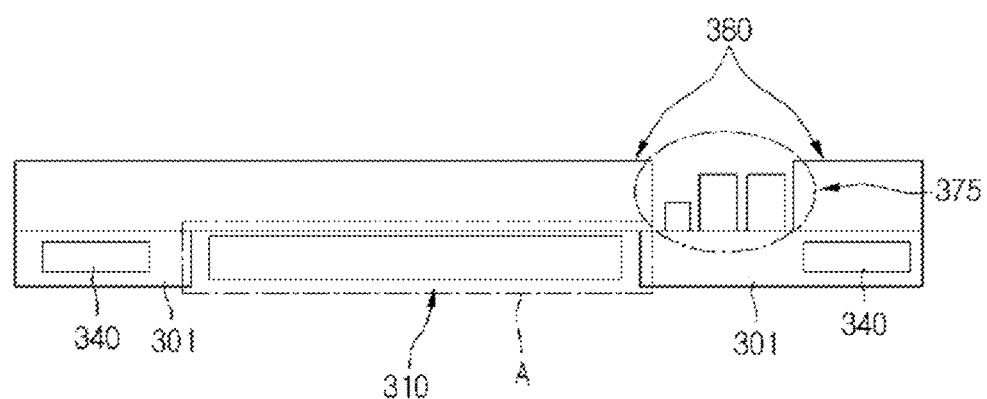
FIG. 7 is a sectional view showing an arrangement of elements of the wireless power receiver according to the embodiment.
Figure 8:
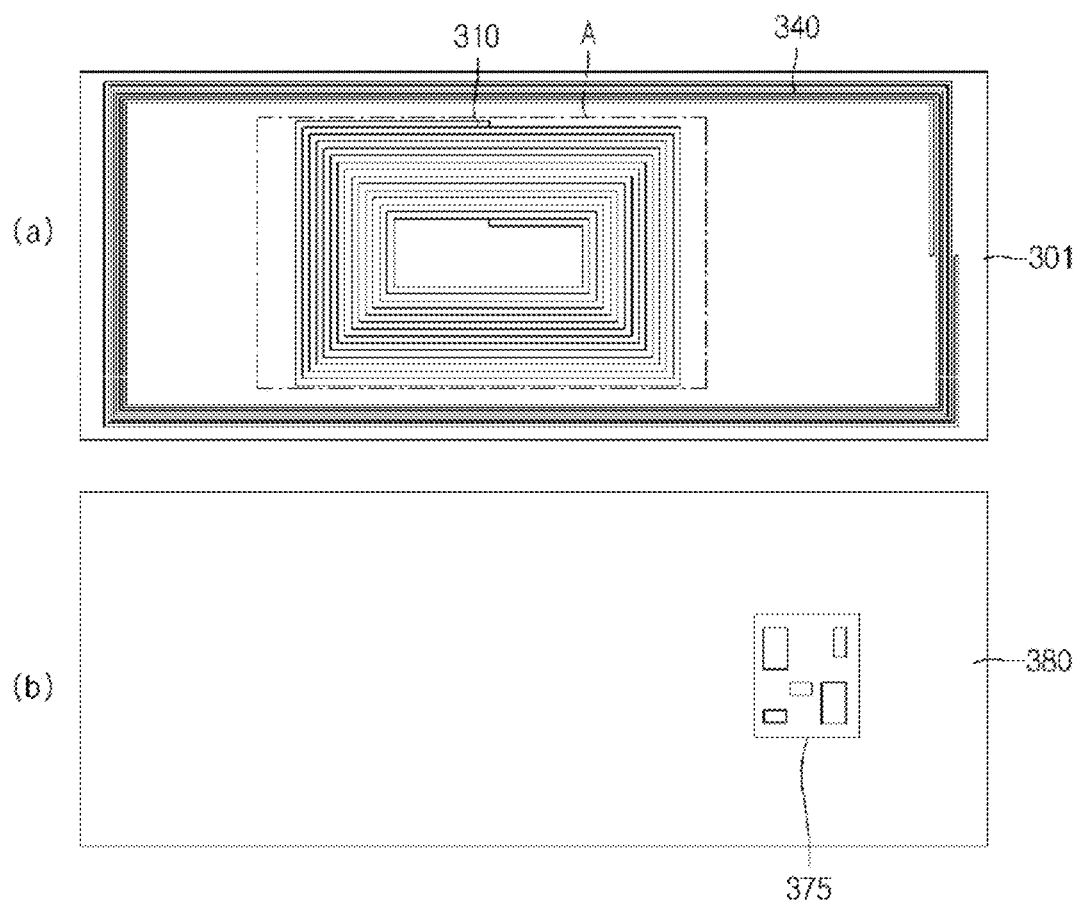
FIG. 8 is a view illustrating a top surface and a bottom surface of the wireless power receiver according to the embodiment.
Figure 9:
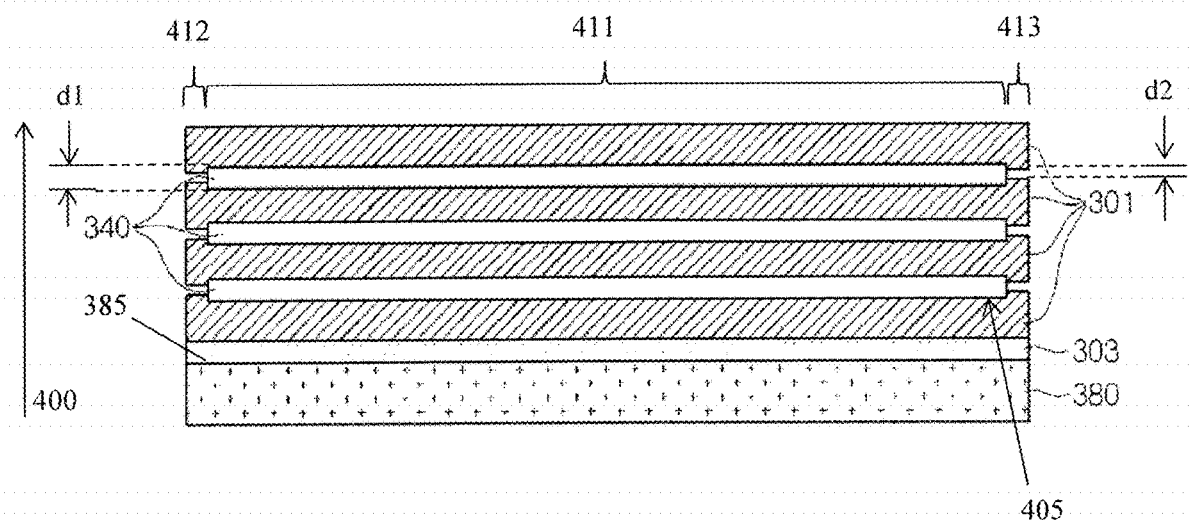
FIG. 9 is a view illustrating one example of attaching a shielding unit onto the wireless power receiver according to the embodiment.
Figure 10:
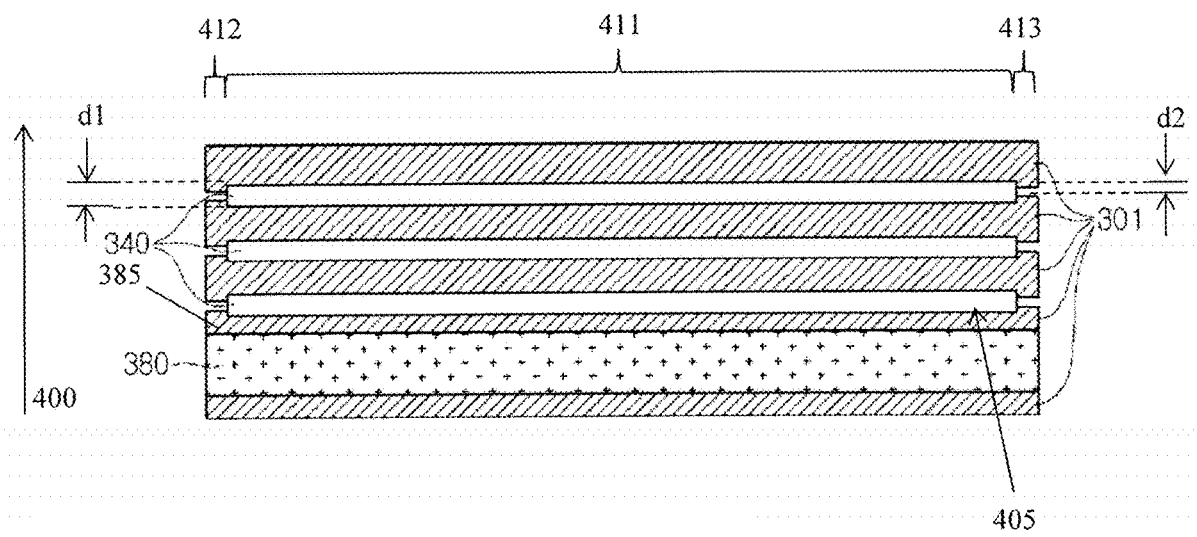
FIG. 10 is a view illustrating one example of inserting the shielding unit into the wireless power receiver according to the embodiment.

FIG. 4 is a block diagram of a wireless power receiver according to the embodiment, FIG. 5 is a view showing an example of a configuration of the wireless power receiver according to the embodiment, FIG. 6 is a exploded perspective and sectional view illustrating the wireless power receiver according to the embodiment, FIG. 7 is a sectional view showing an arrangement of elements of the wireless power receiver according to the embodiment, FIG. 8 is a view illustrating a top surface and a bottom surface of the wireless power receiver according to the embodiment, FIG. 9 is a view illustrating one example of attaching a shielding unit onto the wireless power receiver according to the embodiment, and FIG. 10 is a view illustrating one example of inserting the shielding unit into the wireless power receiver according to the embodiment.

First, referring to FIG. 4, the wireless power receiver 300 may include a receiving coil 310, a short-range communication antenna 340, a switch 350, a protecting unit 360, a short-range communication module 370, a shielding unit 380, and a controller 390.

The wireless power receiver 300 according to the embodiment may be installed in a terminal or an electronic appliance requiring power, such as a portable terminal, a laptop computer, and a mouse.

The receiving coil 310 receives power from the transmitting coil 210 of the wireless power transmitter 200 through electromagnetic induction. That is, if a magnetic field is generated as an AC current flows through the transmitting coil 210, a current is induced to the receiving coil 310 by the generated magnetic field so that an AC current flows therethrough.

In the embodiment, the receiving coil 310 may be disposed in a reception space of a printed circuit board 301.

The receiving coil 310 may be provided by winding a conducting wire server times. In the embodiment, the receiving coil 310 may have a spiral shape, but the embodiment is not limited thereto.

The short-range communication antenna 340 may communicate with a reader capable of performing a short-range communication. The short-range communication antenna 340 may perform a function of an antenna which transmits and receives information to and from the reader. In the embodiment, the short-range communication antenna 340 may be disposed at an outside of the receiving coil 310. In the embodiment, the receiving coil 310 may be disposed in the reception space inside the printed circuit board 301, and the short-range communication antenna 340 may be disposed to surround the receiving coil 310 on the printed circuit board 301.

The above configuration will be described in more detail with reference to FIG. 6.

Referring to the exploded perspective view of the wireless power receiver 300 shown in FIG. 6(a), the wireless power receiver 300 may include a case 302, the printed circuit board 301, the receiving coil 310, the short-range communication antenna 340 and the shielding unit 380. Here, the case 302 refers to a case of a portable terminal, but the embodiment is not limited thereto. The shielding unit 380 will be described later.

Referring to FIG. 6(a), it may be identified that the receiving coil 310 is disposed in the reception space A of the printed circuit board 301 and the short-range communication antenna 340 is disposed on the printed circuit board 301. That is, the receiving coil 310 may be disposed in the reception space A provided inside the printed circuit board 301, and the short-range communication antenna 340 may be disposed at an upper side of the printed circuit board 301 while surrounding the reception space A.

FIG. 6 (b) is a sectional view showing the arrangement of the elements of the wireless power receiver 300 illustrated in FIG. 6(a).

In the embodiment, the printed circuit board 301, the receiving coil 310 and the short-range communication antenna 340 may be inserted into the case 302 through the injection molding. Further, as described above, the short-range communication antenna 340 may be disposed at an outer periphery on the printed circuit board 301 while surrounding the receiving coil 310 placed in the reception space A.

Hereinafter, the arrangement among the receiving coil 310, the short-range communication antenna 340 and the printed circuit board 301 will be described in more detail with reference to FIGS. 7 and 8.

First, referring to FIG. 7, the printed circuit board 301 has the reception space A in a predetermined area thereof. In the embodiment, the predetermined area may include the central portion of the printed circuit board 301. In the embodiment, the central portion of the printed circuit board 301 may have the reception space having a polygonal shape, such as a rectangular shape and a circular shape.

The receiving coil 310 is disposed in the reception space A of the printed circuit board 301, and receives power from the transmission induction coil 210 through electromagnetic induction. In the embodiment, the receiving coil 310 and the printed circuit board 301 may be manufactured such that the thickness of the receiving coil 310 may be equal to that of the printed circuit board 301 or the thickness of the receiving coil 310 may be less than that of the printed circuit board 301. In this case, the increase of the thickness of the wireless power receiver 300 due to the thicknesses of the receiving coil 310 and the short-range communication antenna 340 is inhibited, so that the wireless power receiver 300 can be easily embedded in the case of the portable terminal.

In the embodiment, the receiving coil 310 may be manufactured to have a shape in match with a shape of the reception space A of the printed circuit board 310. For example, when the shape of the reception space A of the printed circuit board 310 is rectangular, the receiving coil 310 or the conducting wire may be wound in a rectangular shape. When the shape of the reception space A of the printed circuit board 310 is circular, the receiving coil 310 or the conducting wire may be wound in a circular shape. Thus, the receiving coil 310 or the conducting wire may have various shapes.

The short-range communication antenna 340 may be included in the printed circuit board 301 and may be configured to surround the receiving coil 310. In the embodiment, the short-range communication antenna 340 may be manufactured such that the short-range communication antenna 340 may be embedded in the printed circuit board 301, and may be configured to surround the outer periphery of the receiving coil 310 having various shapes such as a rectangular shape or a circular shape. In this case, the increase of the thickness of the wireless power receiver 300 due to the thickness of the printed circuit board 301 and the short-range communication antenna 340 can be inhibited so that the wireless power receiver 300 can be easily installed in the case of the portable terminal.

The wireless power receiver 300 may further include a shielding unit 380 for shielding a magnetic field generated by the receiving coil 310. In the embodiment, the shielding unit 380 may be disposed to cover an area occupied by the receiving coil 310. In the embodiment, the shielding unit 380 may be disposed on the receiving coil 310 and the short-range communication antenna 340 such that the shielding unit 380 may include the area occupied by the receiving coil 310 and the short-range communication antenna 340.

In the embodiment, the shielding unit 380 may have a reception space in a predetermined area thereof. A wireless charging circuit 375, which is place on the top surface of the printed circuit board 301, may be disposed in the reception space of the shielding unit 380. The wireless charging circuit 375 may include a rectifier circuit for converting AC power into DC power, a capacitor for removing a noise signal, and a main IC chip for performing the operation for the wireless power reception.

In the embodiment, the shielding unit 380 and the wireless charging circuit 375 may be manufactured such that the thickness of the shielding unit 380 may be equal to that of the wireless charging circuit 375 or the thickness of the shielding unit 380 may be less than that of the wireless charging circuit 375. In this case, the increase of the thickness of the wireless power receiver 300 due to the thicknesses of the shielding unit 380 and the wireless charging circuit 375 can be inhibited, so that the wireless power receiver 300 can be easily installed in the case of the portable terminal.

FIG. 8(a) is a view showing a bottom surface of the wireless power receiver according to the embodiment and FIG. 8(b) is a view showing a top surface of the wireless power receiver according to the embodiment.

FIG. 8(a) illustrates the arrangement of the printed circuit board 310, the receiving coil 310 and the short-range communication antenna 340 according to the embodiment. The printed circuit board 301 has a reception space A in the central area, and the receiving coil 310 having a rectangular shape is disposed in the reception space A. The short-range communication antenna 340 is embedded in the printed circuit board 301. In this case, the increase of the thickness of the wireless power receiver 300 due to the thickness of the printed circuit board 301 and the short-range communication antenna 340 can be inhibited, so that the wireless power receiver 300 can be easily installed in the case of the portable terminal.

Further, the receiving coil 310 and the printed circuit board 301 may be manufactured such that the thickness of the receiving coil 310 may be equal to that of the printed circuit board 301 or the thickness of the receiving coil 310 may be less than that of the printed circuit board 301. In this case, the increase of the thickness of the wireless power receiver 300 due to the thickness of the receiving coil 310 and the printed circuit board 301 can be inhibited, so that the wireless power receiver 300 can be easily installed in the case of the portable terminal.

FIG. 8 (b) illustrates the arrangement of the wireless charging circuit 375 and the shielding unit 380 according to the embodiment. The shielding unit 380 may have a reception space in a predetermined area thereof, and the wireless charging circuit 375 may be disposed in the reception space of the shielding unit 380.

In the embodiment, the shielding unit 380 and the wireless charging circuit 375 may be manufactured such that the thickness of the wireless charging circuit 375 may be equal to that of the wireless charging circuit 375 or the thickness of the shielding unit 380 may be less than that of the wireless charging circuit 375. In this case, the increase of the thickness of the wireless power receiver 300 due to the thickness of the shielding unit 380 and the wireless charging circuit 375 can be inhibited, so that the wireless power receiver 300 can be easily installed in the case of the portable terminal.

Referring again to FIG. 4, although various technologies can be applied to a short-range communication protocol used in the wireless communication antenna 340 and a short-range are communication module 370 which will be described below, NFC (Near Field Communication) may be preferably used for the wireless communication antenna 340 and the short-range communication module 370. The NFC is a technology for performing wireless communication in a short-range through the bandwidth of 13.56 MHz.

The switch 350 is connected to the short-range communication antenna 340 and receives an open or short signal from the controller 390 to be described below such that the switch 350 may change a conducting state of the short-range communication antenna.

If it is determined that the power is received from the transmitting coil 320, the switch 350 may receive the open signal from the controller 390 such that the switch 350 may break the current from flowing through the short-range communication antenna 340.

If the wireless power receiver 300 is charged with an amount of power equal to or higher than a threshold value, the switch 350 may receive the short signal from the controller 390 such that the switch 350 may conduct the current through the short-range communication antenna 340, so the switch 350 may allow the short-range communication antenna 340 to be operated.

The protecting unit 360 is operated when a current equal to or higher than a threshold current value flows through the protecting unit 360, such that the protecting unit 360 may break the current equal to or higher than the threshold current value from being transferred to the short-range communication module 370.

In the embodiment, as shown in FIG. 5, the protecting unit 360 may include at least one zener diode. The zener diode may allow only a current having a value equal to or less than a threshold current value to flow through a circuit. The threshold current value may be variably set and may be a limit value at which the short-range communication module 370 may be normally operated.

When a current transferred to the short-range communication antenna 340 has the threshold current value or above, the protecting unit 360 changes the flowing direction or the flow of the current to inhibit an overcurrent from flowing through the short-range communication module 370.

Referring to FIG. 5, if the current flowing through the short-range communication antenna 340 has the threshold current value or above, the protecting unit 350 is operated. Referring to FIG. 5, when the current flowing in the A-direction has the threshold current value or above, the current having the threshold current value or above flows into the zener diode placed at an upper side of the protecting unit 350.

In a case that the current flowing in the B-direction has the threshold current value or above, the same procedure is performed.

An overcurrent having the threshold current value or above flows through the zener diode and is discharged as thermal energy. That is, the protecting unit 360 may inhibit the overcurrent from flowing through the short-range communication module 370, so that damage of the communication module 370 may be inhibited.

Referring again to FIG. 4, the short-range communication module 370 may receive a current through the short-range communication antenna 340. Although various types of communication technologies can be applied to the short-range communication module 370, the NFC (Near Field Communication) protocol may be preferably used.

The shielding unit 380 may change a direction of the magnetic field generated from the receiving coil 310. The shielding unit 380 may absorb the magnetic field generated from the receiving coil 310 and may discharge the absorbed magnetic field as thermal energy.

That is, as the shielding unit 380 may change the direction of the magnetic field generated from the coil 310 or absorb and discharge the magnetic field as thermal energy, it is possible to inhibit the magnetic field from exerting bad influence upon any other elements inside an electronic appliance to which the wireless power receiver 300 is installed. That is, the shielding unit 380 can inhibit the malfunction caused by the magnetic field applied to other elements.

The shielding unit 380 may include ferrite, but the embodiment is not limited thereto.

The shielding unit 380 may be disposed at one side of the wireless power receiver 300.

Hereinafter, the arrangement of the shielding unit 380 on the wireless power receiver 300 will be described with reference to FIGS. 9 and 10.

First, referring to FIG. 9, after the short-range communication antenna 340 has been disposed on in the printed circuit board 301, the shielding unit 380 may be attached to one side of the printed circuit board 301 with an adhesive. The printed circuit board 301 comprises a plurality of layers wherein each layer of the plurality of layers is spaced apart from adjacent layers. The shielding unit 380 is disposed under the short-range communication antenna 340 or the receiving coil 310 (not shown in the FIG. 9). Referring still to FIG. 9, in a first region 411, at least one of the layers can overlap 405 the wireless power receiving coil in a vertical direction 400 perpendicular to an upper surface 385 of the shielding unit 380; and in a second region 412,413, at least one of the layers does not overlap the wireless power receiving coil in the vertical direction 400. Also, a first gap d1 or a first distance d1, measured in the vertical direction 400, between layers in the first region 411 can be greater than a second gap d2 or a second distance d2, measured in the vertical direction, between layers in the second region 412,413.

Referring to FIG. 10, the printed circuit board 301 comprises a plurality of layers wherein each layer of the plurality of layers is spaced apart from adjacent layers, the short-range communication antenna 340 or the receiving coil 310 (not shown in the FIG. 10) is disposed in the printed circuit board 301. Moreover, the shielding unit 380 is disposed in the printed circuit board 301. The shielding unit 380 is disposed under the receiving coil 310 or the short-range communication antenna 340. The receiving coil 310 (not shown in the FIG. 10), the short-range communication antenna 340, and the shielding unit 380 are disposed between the plurality of layers of the printed circuit board 301. While the procedure of disposing the short-range communication antenna 340 or receiving coil (310)(not shown in the FIG. 10) in the printed circuit board 301 is being performed, the shielding unit 380 may be inserted into the printed circuit board 301. That is, unlike FIG. 9, since the shielding unit 380 is disposed in the printed circuit board 301, the procedure of disposing the shielding unit 380 may be included in the procedure of disposing the short-range communication antenna 340 without performing the procedure of disposing the shielding unit 380 at one side of the printed circuit board 301. That is, as described above, according to the embodiment shown in FIG. 8, when the shielding unit 380 is inserted into the printed circuit board 301, the entire thickness of the wireless power receiver 300 may be reduced corresponding to the thickness of the adhesive 303. Thus, a separate procedure of attaching the shielding unit 380 is not necessary, so the manufacturing process may be simplified. Referring still to FIG. 10, in a first region 411, at least one of the layers can overlap 405 the wireless power receiving coil in a vertical direction 400 perpendicular to an upper surface 385 of the shielding unit 380: and in a second region 412,413, at least one of the layers does not overlap the wireless power receiving coil in the vertical direction 400. Also, a first gap d1 or a first distance d1, measured in the vertical direction 400, between layers in the first region 411 can be greater than a second gap d2 or a second distance d2, measured in the vertical direction, between layers in the second region 412,413.

Referring again to FIG. 4, the controller 390 may control an entire operation of the wireless power receiver 300.

The controller 390 may change an operating mode of the wireless power receiver 300 into a charging mode or a communication mode according to a reception of the power. In the embodiment, the charging mode may be that the wireless power receiver 300 does not communicate with an outside through the short-range communication module 370, but receives power from the transmitting coil 210. The communication mode may be that the wireless power receiver 300 does not receive power from the transmitting coil 210, but communicate with an outside through the short-range communication module 370.

The controller 390 may change the conducting state of the short-range communication antenna 340 by opening or shorting the switch 350. If a current is induced to the receiving coil 310 in the state that the switch 350 is shorted, the controller 390 may open the switch 350 to change the operating mode of the wireless power receiver 300 into the charging mode. That is, if the controller 390 receives power from the transmitting coil 210, the controller 390 opens the switch 350 to inhibit the current from flowing through the short-range communication antenna 340. In the state that the switch 350 is opened, if a current is not induced to the receiving coil 310, the controller 390 may short the switch 350 to change the operating mode of the wireless power receiver 300 into the communication mode. That is, if the controller does not receive power from the transmitting coil 210, the controller 390 may short the switch 350 to allow a current to conduct the short-range communication antenna 340.

The controller 390 may sense the current flowing through the receiving coil 310 for changing the conductive state of the short-range communication antenna 340. In another embodiment, the wireless power receiver 300 may further include a separate current sensing unit (not shown) which can sense the current induced to the receiving coil 310 to sense the current flowing through the receiving coil 310.

The controller 390 may open or short the switch 350 according to an amount of power received at the wireless power receiver 300. This will be described below with reference to FIG. 11.

Figure 11:
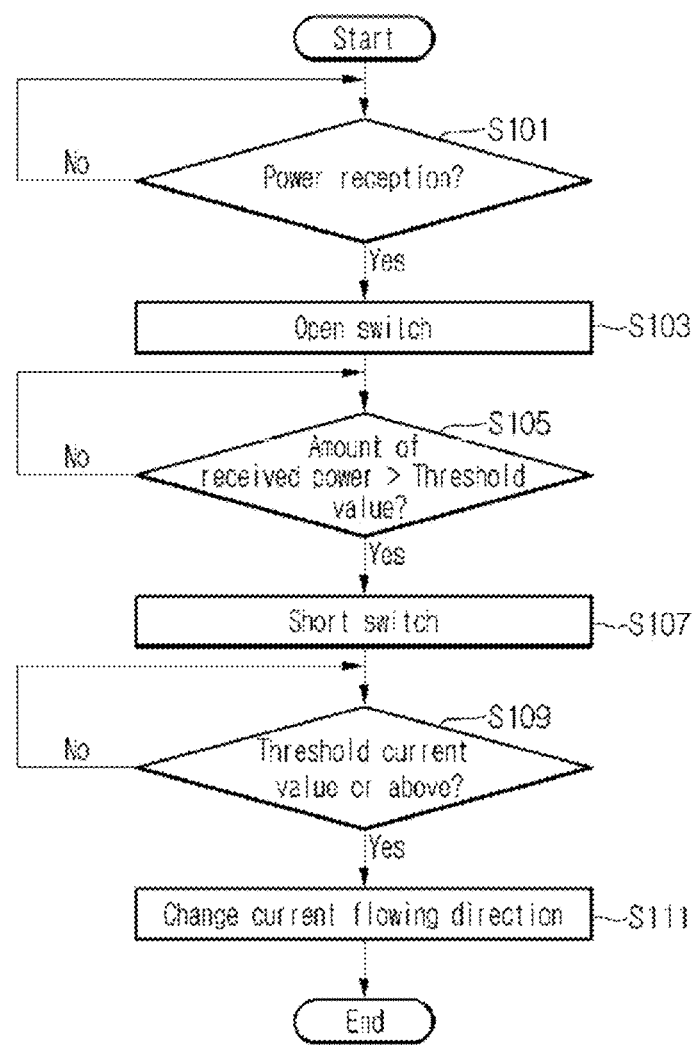
FIG. 11 is a flowchart illustrating a control method of the wireless power receiver according to the embodiment.

FIG. 11 is a flowchart illustrating a control method of the wireless power receiver according to the embodiment.

Hereinafter, the control method of the wireless power receiver according to the embodiment will be described with reference to FIGS. 1 to 10.

In step S101, the controller 390 may determine whether the receiving coil 310 receives power from the transmitting coil 210 through electromagnetic induction. In the embodiment, the wireless power receiver 300 may further include a detecting unit (not shown) to determine whether power is received. A detecting coil may be used as the detecting unit.

In step S103, if it is determined that the receiving coil 310 receives power from the transmitting coil 210 through electromagnetic induction, the switch 350, which changes the conductive state of the short-range communication antenna 340, may be opened. That is, the controller 390 may transmit an open signal to the switch 350 to inhibit the current from flowing through the short-range communication antenna 340. In the embodiment, when it is determined that the receiving coil 310 receives power from the transmitting coil 210 through electromagnetic induction, the wireless power receiver 300 may be in the charging mode. When the wireless power receiver 200 is operated in the charging mode to receive power from the transmitting coil 310, the current flowing through the short-range communication antenna must be shut off because the magnetic field generated during the charging mode may interfere with the communication between the short-range communication module 370 and the outside.

Then, in step S105, the controller 390 may determine whether the amount of power received at the wireless power receiver 300 is more than the threshold value. In the embodiment, although the threshold value corresponds to the state that the wireless power receiver 300 is charged at 100%, the threshold value is not limited thereto and may be variously set by a user.

Then, in step S107, when the amount of power has the threshold value or above, the controller 390 allows the switch to be shorted. In this case, the wireless power receiver 300 terminates the charging mode and operates in the communication mode.

Then, in step S109, the controller 390 determines whether the current flowing through the short-range communication antenna 340 is equal to or greater than the threshold current value. In step S111, when the current flowing through the short-range communication antenna 340 is equal to or greater than the threshold current value, the current flowing direction may be changed. In the embodiment, the threshold current value may mean a limit value allowing the short-range communication to be operated normally. In the embodiment, the threshold current value may be variously set by a user. In the embodiment, the change of the current flowing direction may be performed through the protecting unit 360. In the embodiment, the protecting unit 360 may be a zener diode. If the current having the threshold current value or above flows, the zener diode performs the function of discharging the current as thermal energy. In this case, the zener diode may inhibit an overcurrent from flowing through the short-range communication module 370, such that damage of the short-range communication module 370 may be inhibited.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power receiver, comprising:
a shielding unit;

a first layer on the shielding unit;
a wireless power receiving coil on the first layer;
a second layer on the wireless power receiving coil;
a first region in which at least one of the first layer and the second layer overlaps the wireless power receiving coil in a vertical direction perpendicular to an upper surface of the shielding unit; and
a second region in which at least one of the first layer and the second layer does not overlap the wireless power receiving coil in the vertical direction,
wherein a first distance, measured in the vertical direction, between the first layer and the second layer in the first region is greater than a second distance, measured in the vertical direction, between the first layer and the second layer in the second region.

2. The wireless power receiver of claim 1, wherein the second distance is smaller than a thickness, measured in the vertical direction, of the wireless power receiving coil.

3. The wireless power receiver of claim 1, wherein a thickness, measured in the vertical direction, of the first layer in the first region is smaller than a thickness, measured in the vertical direction, of the first layer in the second region.

4. The wireless power receiver of claim 3, wherein a thickness, measured in the vertical direction, of the second layer in the first region is smaller than a thickness, measured in the vertical direction, of the second layer in the second region.

5. The wireless power receiver of claim 1, wherein a portion of the first layer is disposed on a side surface of the wireless power receiving coil.

6. The wireless power receiver of claim 5, wherein a portion of the second layer is disposed on the side surface of the wireless power receiving coil.

7. The wireless power receiver of claim 1, comprising: a short range communication antenna on the first layer.

8. The wireless power receiver of claim 7, comprising:
a third region in which at least one of the first layer and the second layer overlaps the short range communication antenna in the vertical direction; and
a fourth region in which at least one of the first layer and the second layer does not overlap the short range communication antenna in the vertical direction,
wherein a third distance, measured in the vertical direction, between the first layer and the second layer in the third region is greater than a fourth distance, measured in the vertical direction, between the first layer and the second layer in the fourth region.

9. The wireless power receiver of claim 8, wherein the fourth distance is smaller than a thickness, measured in the vertical direction, of the short range communication antenna.

10. The wireless power receiver of claim 9, wherein a thickness, measured in the vertical direction, of the first layer in the third region is smaller than a thickness, measured in the vertical direction, of the first layer in the fourth region.

11. The wireless power receiver of claim 8, wherein a thickness, measured in the vertical direction, of the second layer in the third region is smaller than a thickness, measured in the vertical direction, of the second layer in the fourth region.

12. The wireless power receiver of claim 11, wherein a portion of the first layer is disposed on a side surface of the short range communication antenna.

13. The wireless power receiver of claim 8, wherein a portion of the second layer is disposed on the side surface of the short range communication antenna.

14. The wireless power receiver of claim 1, comprising: an adhesive between the shielding unit and the first layer.

15. The wireless power receiver of claim 1, wherein the shielding unit has a reception space in a predetermined area.

16. The wireless power receiver of claim 1, wherein the second region is positioned at an outer side of the wireless power receiving coil.

17. A wireless power receiver, comprising:
a shielding unit;
a first layer on the shielding unit;
a first wireless power receiving coil on the first layer;
a second layer on the first wireless power receiving coil;
a second wireless power receiving coil on the second layer;
a third layer on the second wireless power receiving coil;
a first region in which the second layer overlaps the first wireless power receiving coil and the second wireless power receiving coil in a vertical direction perpendicular to an upper surface of the shielding unit; and
a second region in which the second layer does not vertically overlap the first wireless power receiving coil or the second wireless power receiving coil in the vertical direction;
wherein at least one of the following two conditions is met:
i) a first distance, measured in the vertical direction, between the first layer and the second layer in the first region is greater than a second distance, measured in the vertical direction, between the first layer and the second layer in the second region; and
ii) a third distance, measured in the vertical direction, between the second layer and the third layer in the first region is greater than a fourth distance, measured in the vertical direction, between the second layer and the third layer in the second region.

18. The wireless power receiver of claim 17, wherein the second region is positioned at an outer side of the first wireless power receiving coil, at an outer side of the second wireless power receiving coil, or both.

19. A wireless power receiver, comprising:
a shielding unit;
a first layer on the shielding unit;
a wireless power receiving coil on the first layer;
a second layer on the wireless power receiving coil;
a first region in which at least one of the first layer and the second layer overlaps the wireless power receiving coil in a vertical direction perpendicular to an upper surface of the shielding unit; and
a second region in which at least one of the first layer and the second layer does not overlap the wireless power receiving coil in the vertical direction,
wherein a first gap between the first layer and the second layer in the first region is larger than a second gap between the first layer and the second layer in the second region.

20. The wireless power receiver of claim 19, wherein the second gap is smaller than a thickness, measured in the vertical direction, of the wireless power receiving coil.

* * * * *

(12) INTER PARTES REVIEW CERTIFICATE (3402nd)
United States Patent  (10) Number: US 10,622,842 K1
Lee et al.  (45) Certificate Issued: Feb. 2, 2024

(54) WIRELESS POWER RECEIVER AND CONTROL METHOD THEREOF

(71) Applicants: Ki Min Lee; Jung Oh Lee

(72) Inventors: Ki Min Lee; Jung Oh Lee

(73) Assignee: SCRAMOGE TECHNOLOGY LIMITED

Trial Number:

IPR2022-00351 filed Dec. 23, 2021

Inter Partes Review Certificate for:

Patent No.: 10,622,842
Issued: Apr. 14, 2020
Appl. No.: 16/182,258
Filed: Nov. 6, 2018

The results of IPR2022-00351 are reflected in this inter partes review certificate under 35 U.S.C. 318(b).

INTER PARTES REVIEW CERTIFICATE
U.S. Patent 10,622,842 K1
Trial No. IPR2022-00351
Certificate Issued Feb. 2, 2024

AS A RESULT OF THE INTER PARTES REVIEW PROCEEDING, IT HAS BEEN DETERMINED THAT:

Claims 1, 2, 5-7, 14-16, 19, and 20 are cancelled.

\* \* \* \* \*